US006877761B2

(12) United States Patent
Hsia (10) Patent No.: US 6,877,761 B2
(45) Date of Patent: Apr. 12, 2005

(54) STROLLER SUITABLE FOR SEATING AND RECLINING OF A BABY

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 10/653,911

(22) Filed: Sep. 4, 2003

(65) Prior Publication Data

US 2005/0051998 A1 Mar. 10, 2005

(51) Int. Cl.⁷ ................................................ B62B 7/06
(52) U.S. Cl. ...................... 280/642; 280/650; 280/658; 280/47.4
(58) Field of Search ............................... 280/642, 641, 280/643, 647, 348, 649, 650, 47.41, 47.4, 280/47.38, 47.34, 47.36, 47.39, 657, 658; 297/464, 297/428

(56) References Cited

U.S. PATENT DOCUMENTS

| | | | | |
|---|---|---|---|---|
| 4,741,551 A | * | 5/1988 | Perego ........................ | 280/642 |
| 5,662,380 A | * | 9/1997 | Tam et al. ............. | 297/354.12 |
| 5,988,670 A | * | 11/1999 | Song et al. ................. | 280/648 |
| 6,189,914 B1 | * | 2/2001 | Worth et al. ................ | 280/642 |
| 6,557,871 B2 | * | 5/2003 | Hsia ........................ | 280/47.38 |
| 6,669,225 B2 | * | 12/2003 | Greger et al. ................ | 280/648 |
| 2003/0052474 A1 | * | 3/2003 | Yang et la. .................. | 280/642 |
| 2003/0227158 A1 | * | 12/2003 | Kassaie t al. ............... | 280/642 |
| 2004/0061312 A1 | * | 4/2004 | Kassai et al. ............... | 280/643 |
| 2004/0124611 A1 | * | 7/2004 | Gong et al. .................. | 280/642 |
| 2004/0140648 A1 | * | 7/2004 | Takubo et al. .............. | 280/642 |

FOREIGN PATENT DOCUMENTS

| | | | |
|---|---|---|---|
| DE | 3901743 A1 | * | 7/1989 |
| JP | 0481452 A1 | * | 4/1992 |

* cited by examiner

*Primary Examiner*—Christopher P. Ellis
*Assistant Examiner*—J. Allen Shriver
(74) *Attorney, Agent, or Firm*—Morgan Lewis & Bockius LLP (57) ABSTRACT

The seat unit of a stroller includes a seat frame mounted on a stroller frame, a backrest frame unit, and a pad assembly. The backrest frame unit includes a backrest support mounted on the seat frame, a movable frame member connected pivotally to the backrest support and pivotable between folded and unfolded positions, and a foldable link member having opposite ends connected pivotally and respectively to the backrest support and the movable frame member. The pad assembly includes a seat pad, a back pad and a backrest pad mounted on the seat frame, the backrest support and the movable frame member, respectively.

15 Claims, 13 Drawing Sheets

STROLLER SUITABLE FOR SEATING AND RECLINING OF A BABY

BACKGROUND OF THE INVENTION

1. Field of the Invention

The invention relates to a stroller, more particularly to a stroller that is suitable for seating and reclining of a baby.

2. Description of the Related Art

Figure 1:
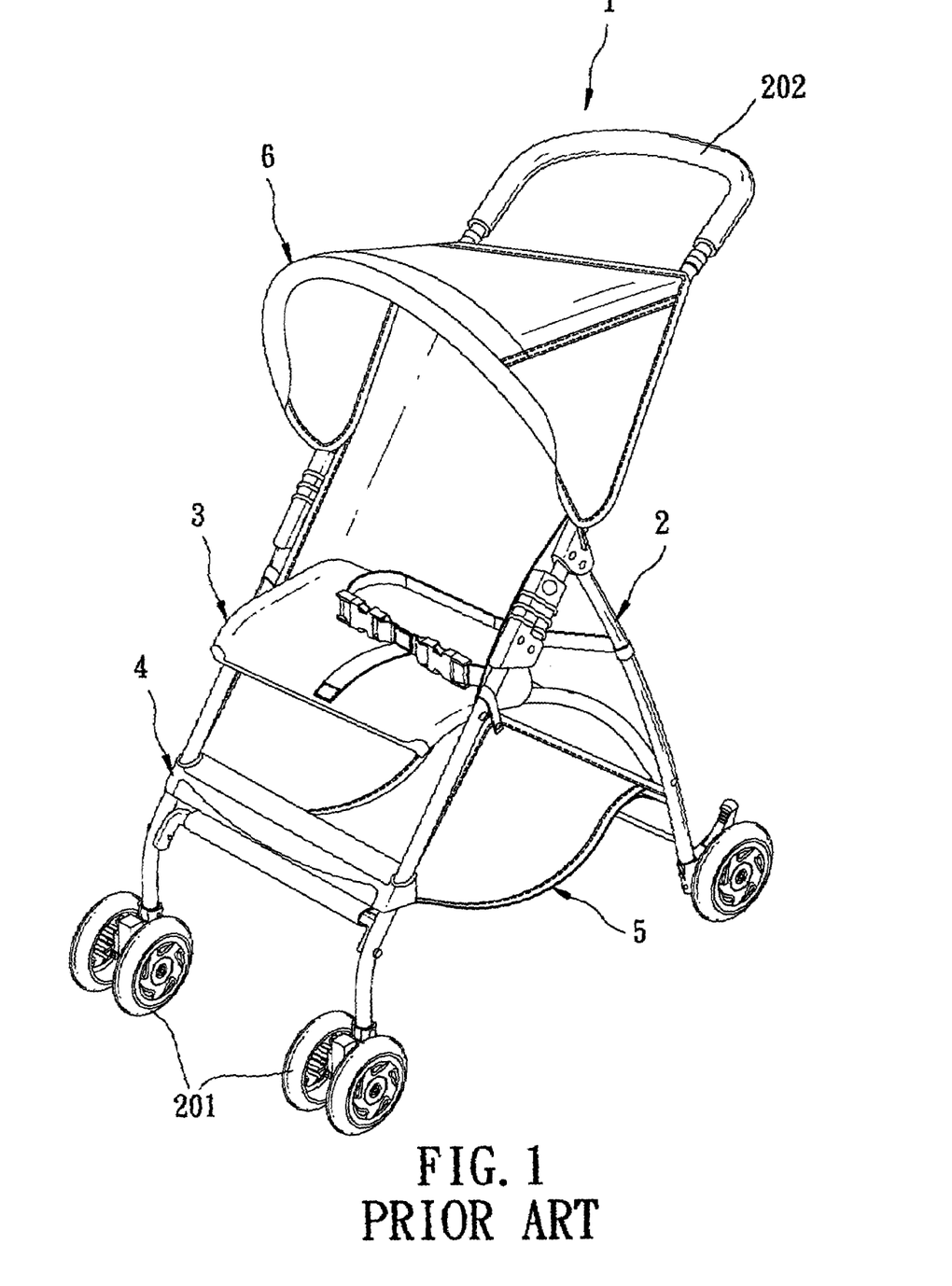
FIG. 1 is a perspective view of a conventional stroller.
Figure 2:
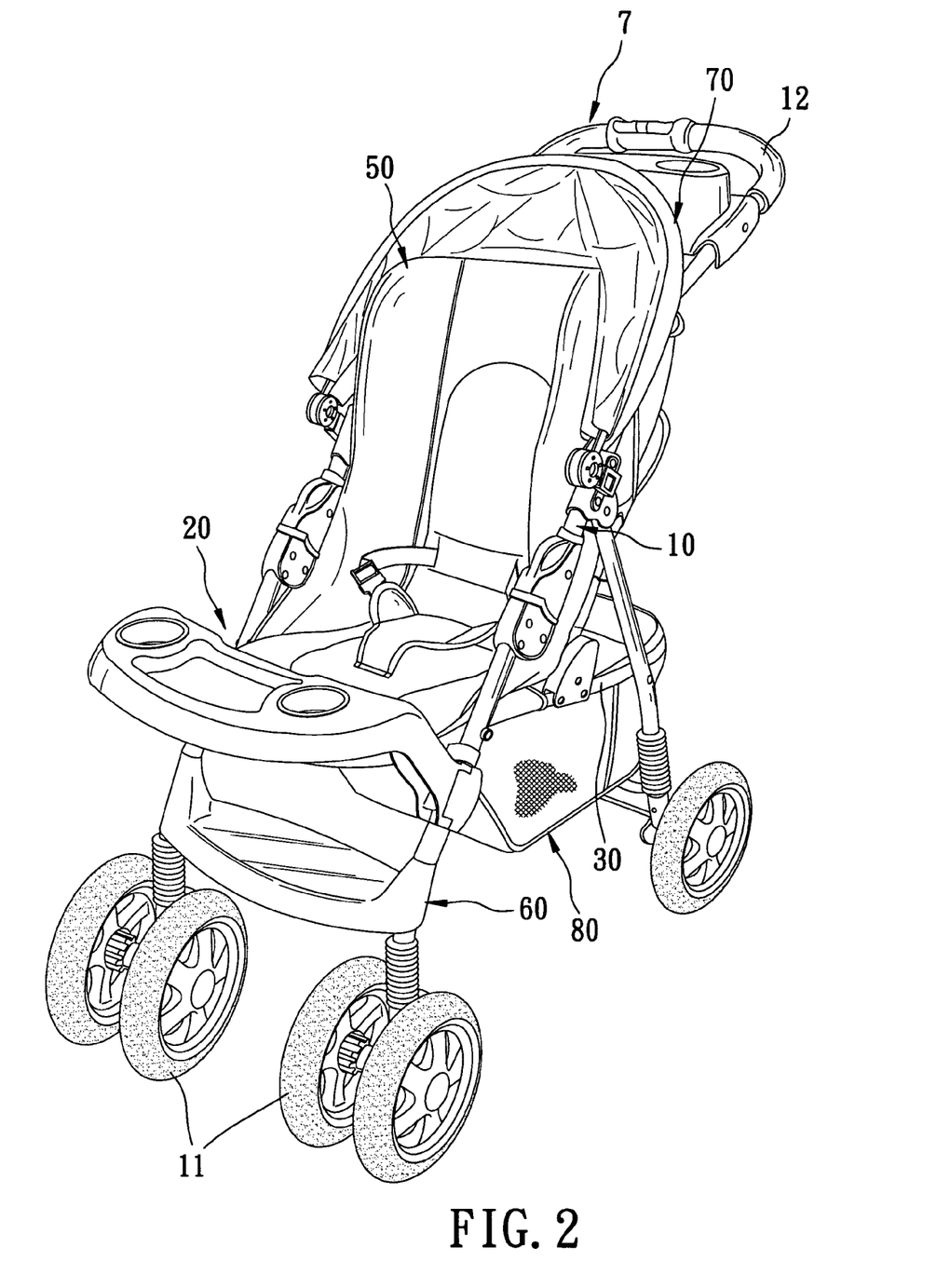
FIG. 2 is a perspective view of the preferred embodiment of a stroller according to the present invention.

As shown in FIG. 1, a conventional stroller 1 includes a stroller frame 2, a seat 3, a footrest 4, a storage basket 5, and a foldable canopy 6. The stroller frame 2 includes a lower frame section mounted with a wheel set 201, an upper frame section provided with a handle unit 202, and a middle frame section between the lower and upper frame sections and mounted with the seat 3, thereby forming a seating space for a baby (not shown). The footrest 4 is mounted on the lower frame section. The storage basket 6 is disposed below the seat 3 for storage purposes. The canopy 6 is mounted on the upper frame section and is used to provide a shade for the seat 3.

It is noted that the seating space arrangement provided in the aforesaid conventional stroller 1 is not suitable for infants who are unable to sit properly. For infants, a reclining space is more practical than a space for seating.

SUMMARY OF THE INVENTION

Therefore, the object of the present invention is to provide a stroller suitable for seating and reclining of a baby so as to overcome the aforesaid drawback of the prior art.

Accordingly, a stroller of this invention comprises a stroller frame and a seat unit.

The stroller frame includes a wheeled lower frame section, an upper frame section provided with a handlebar, and a middle frame section between the lower and upper frame sections.

The seat unit includes a horizontally extending seat frame, a backrest frame unit, and a pad assembly. The seat frame is mounted on the middle frame section of the stroller frame. The backrest frame unit includes a backrest support, a movable frame member, and a foldable link member. The backrest support is mounted on and extends uprightly from the seat frame. The movable frame member is connected pivotally to the backrest support and is pivotable from a folded position, where the movable frame member is disposed proximate to the backrest support, to an unfolded position, where the movable frame member is moved away and extends inclinedly from the backrest support and where the movable frame member is disposed above the seat frame. The foldable link member has opposite ends connected pivotally and respectively to the backrest support and the movable frame member, is folded when the movable frame member is at the folded position, and is unfolded when the movable frame member is at the unfolded position for holding the movable member at the unfolded position. The pad assembly includes a seat pad mounted on the seat frame, a back pad mounted on the backrest support, and a backrest pad mounted on the movable frame member.

The seat pad, the back pad, and the backrest pad have opposite lateral sides. The pad assembly further includes a foldable connecting unit interconnecting the back pad and the backrest pad at the lateral sides of the back pad and the backrest pad. The foldable connecting unit cooperates with the link member to hold the movable frame member at the unfolded position when stretched.

The seat pad and the backrest pad cooperate to form a seating space adapted for seating of a baby therein when the movable frame member is disposed at the folded position.

The backrest pad and the back pad cooperate to form a reclining space adapted for reclining of the baby therein when the movable frame member is disposed at the unfolded position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 2 to 5, the preferred embodiment of a stroller 7 according to the present invention is shown to comprise a stroller frame 10, a seat unit 20, a footrest 60, a foldable canopy unit 70, and a storage basket 80.

The stroller frame 10 includes a lower frame section mounted with a wheel set 11, an upper frame section provided with a handle unit 12, and a middle frame section 13 between the lower and upper frame sections. Since the specific construction of the stroller frame 10 is know in the art and is not pertinent to the claimed invention, a detailed description of the same is dispensed with herein for the sake of brevity.

The seat unit 20 includes a horizontally extending seat frame 30, a backrest frame unit 40, and a pad assembly 50.

The seat frame 30 is a looped frame that is mounted on the middle frame section of the stroller frame 10.

Figure 6:
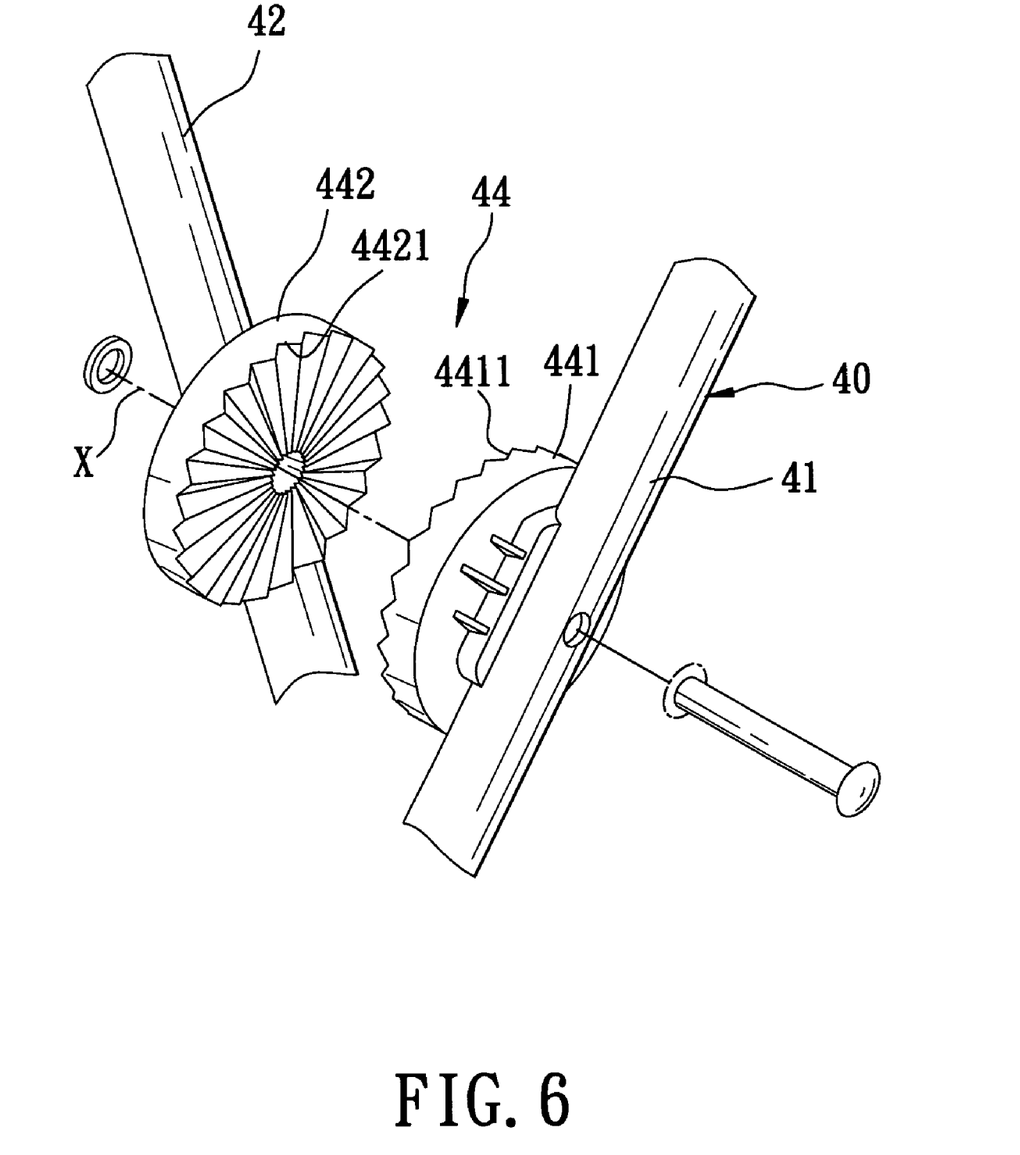
FIG. 6 is a fragmentary partly exploded perspective view of the preferred embodiment, illustrating a friction unit for providing resistance to pivoting movement of the movable frame member relative to a backrest support.
Figure 7:
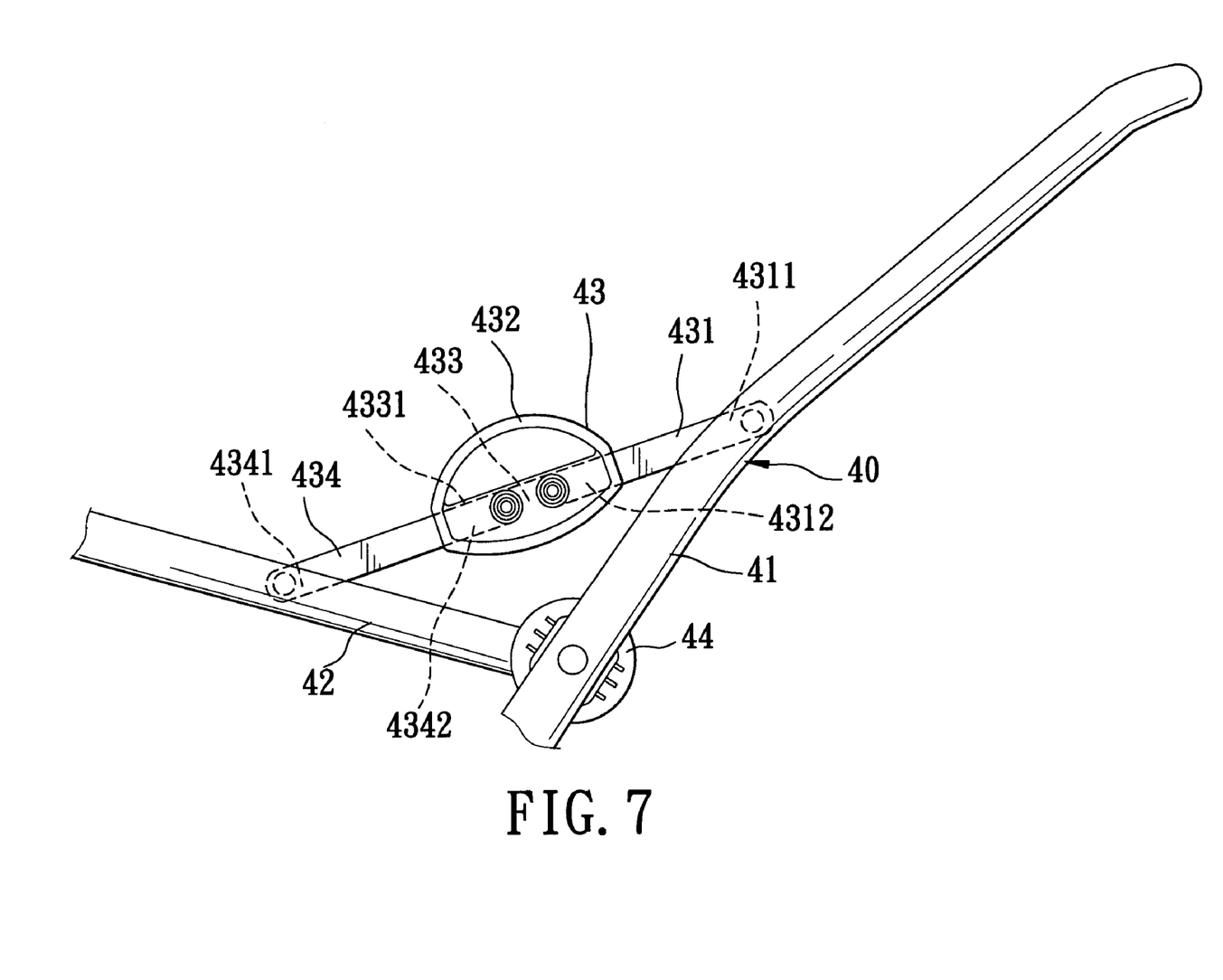
FIG. 7 is a fragmentary schematic side view to illustrate how the movable frame member is held by a foldable link member at the unfolded position.
Figure 8:
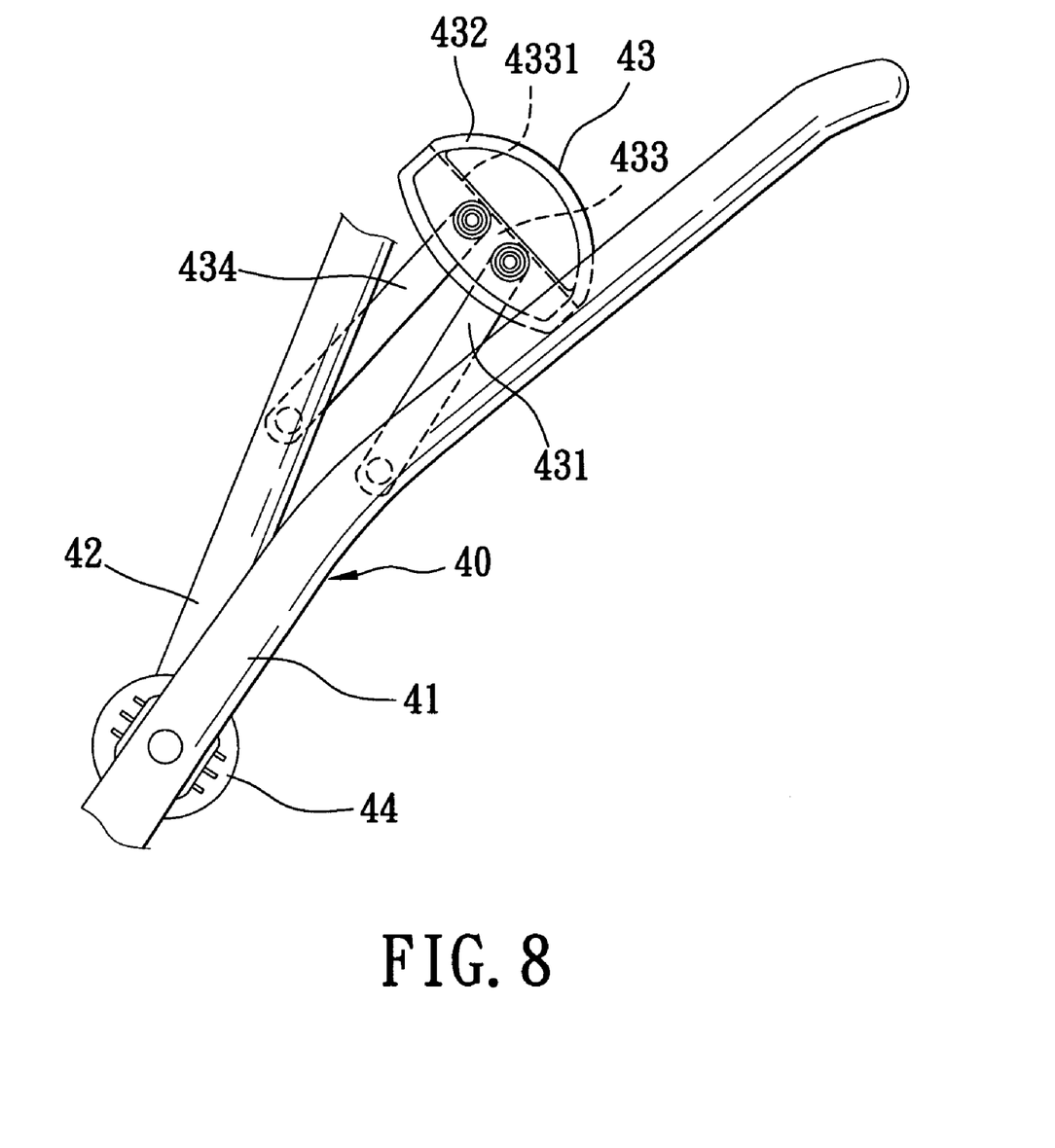
FIG. 8 is a fragmentary schematic side view to illustrate the movable frame member at a folded position.

The backrest frame unit 40 includes a backrest support 41, a movable frame member 42, and a foldable link member 43. The backrest support 41 has a lower end connected to the seat frame 30, and extends uprightly from the seat frame 30. The movable frame member 42 is connected pivotally to an intermediate section of the backrest support 41, and is pivotable from a folded position (see FIG. 8), where the movable frame member 42 is disposed proximate to the backrest support 41, to an unfolded position (see FIG. 7), where the movable frame member 42 is moved away and extends inclinedly from the backrest support 41 and where the movable frame member 42 is disposed above the seat frame 30. Referring to FIG. 7, the link member 43 includes a first link 431, a second link 434, and a connecting plate 432. The first link 431 has a first link portion 4311 connected pivotally to the backrest support 41, and an opposite second link portion 4312. The second link 434 has a first link portion 4341 connected pivotally to the movable frame member 42, and an opposite second link portion 4342. The connecting plate 432 is formed with a slot 433 to receive the second link portions 4312, 4342 of the first and second links 431, 434, is connected pivotally to the second link portions 4312, 4342 of the first and second links 431, 434, and is formed with a stop flange 4331 that abuts against the second link portions 4312, 4342 when the link member 43 is unfolded. With further reference to FIG. 6, in this embodiment, the backrest frame unit 40 includes a friction unit 44 for providing resistance to pivoting movement of the movable frame member 42 relative to the backrest support 41. The movable frame member 42 is rotatable relative to the backrest support 41 about a pivot axis (X). The friction unit 44 includes a first disc 442 mounted securely on the movable frame member 42 and coaxial with the pivot axis (X), and a second disc 441 mounted securely on the backrest support 41 and coaxial with the pivot axis (X). The first and second discs 442, 441 have confronting teethed surfaces 4421, 4411 that are in friction engagement with each other.

The pad assembly 50 includes a seat pad 51 mounted on the seat frame 30, a back pad 52 mounted on the backrest support 41, and a backrest pad 53 mounted on the movable frame member 42. In this embodiment, the seat pad 51 is sleeved on the seat frame 30, the backpad 52 is sleeved on the backrest support 41, and the backrest pad 53 sleeved on the movable frame member 42.

The seat pad 51, the back pad 52, and the backrest pad 53 have opposite lateral sides. The pad assembly 50 further includes a foldable connecting unit interconnecting the back pad 52 and the backrest pad 53 at the lateral sides of the backpad 52 and the backrest pad 53. The foldable connecting unit includes a pair of fabric flaps 56, and cooperates with the link member 43 to hold the movable frame member 42 at the unfolded position, where the backrest pad 53 extends to a height greater than the back pad 52 relative to the ground. The pad assembly 50 further includes a pair of fabric flaps 57 (see FIG. 5) interconnecting the backrest pad 53 and the seat pad 51 at the lateral sides of the backrest pad 53 and the seat pad 51 for strengthening the overall construction of the pad assembly 50 and for protection purposes.

Figure 12:
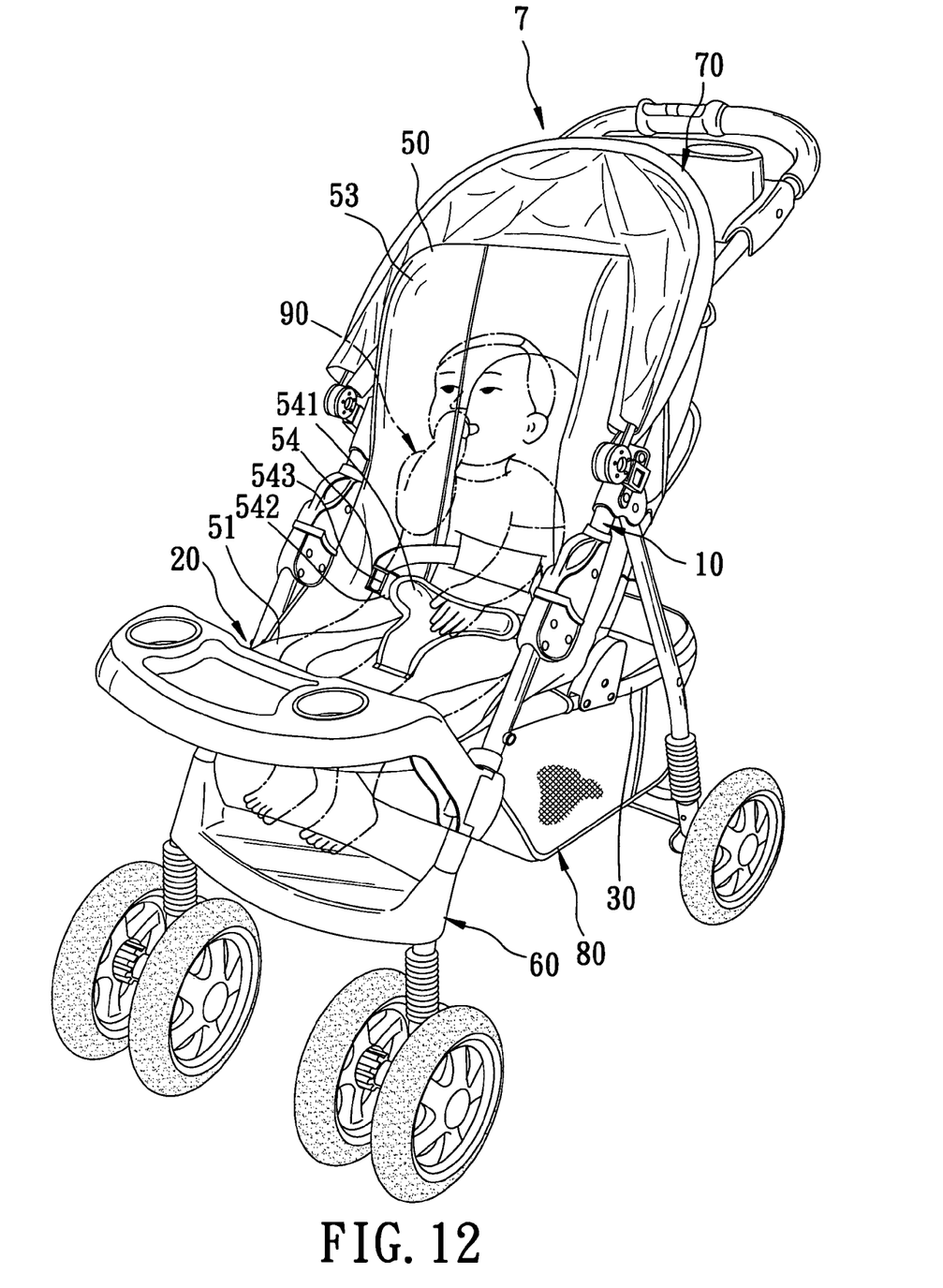
FIG. 12 is a perspective view showing the preferred embodiment when used for seating of a baby.

As shown in FIG. 12, the seat pad 51 and the backrest pad 53 cooperate to form a seating space adapted for seating of a baby 90 therein when the movable frame member 42 is disposed at the folded position. Moreover, as shown in FIG. 13, the backrest pad 53 and the back pad 52 cooperate to form a reclining space adapted for reclining of a baby 100 therein when the movable frame member 42 is disposed at the unfolded position.

Figure 13:
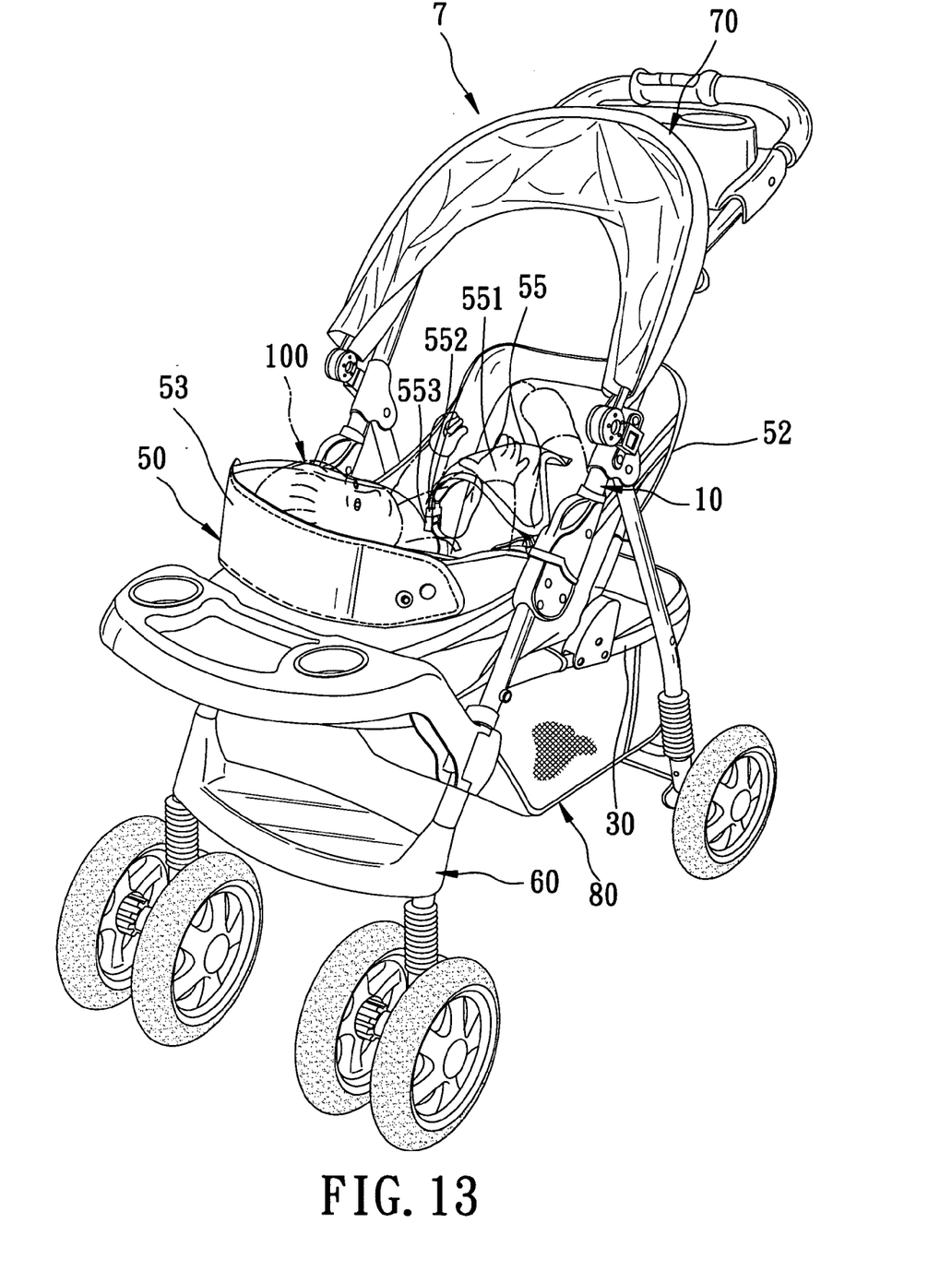
FIG. 13 is a perspective view showing the preferred embodiment when used for reclining of a baby.

The pad assembly 50 further includes a first safety belt device 55 adapted for retaining the baby 100 in the reclining space, as best shown in FIG. 13. The first safety belt device 55 includes a generally T-shaped restraint 551 having a first section connected to a front side of the back pad 52, and a second section transverse to the first section and having opposite ends, each of which is provided with a first fastener 552. Each of a pair of second fasteners 553 is connected to a respective lateral side of the backrest pad 53, and engages releasably the first fastener 552 on a respective one of the ends of the second section of the restraint 551 so as to be adapted to retain the baby 100 in the reclining space. In this embodiment, the first and second fasteners 552, 553 are male and female fasteners.

The pad assembly 50 further includes a second safety belt device 54 adapted for retaining the baby 90 in the seating space. The second safety belt device 54 includes a generally T-shaped restraint 541 having a first section connected to a top side of the seat pad 51, and a second section transverse to the first section and having opposite ends, each of which is provided with a first fastener 542. Each of a pair of second fasteners 543 is connected to a respective lateral side of the backrest pad 53, and engages releasably the first fastener 542 on a respective one of the ends of the second section of the restraint 541 so as to be adapted to retain the baby 90 in the seating space. In this embodiment, the first and second fasteners 542, 543 are male and female fasteners.

Referring again to FIG. 2, the footrest 60 is mounted on the lower frame section of the stroller frame 10 and is disposed at a level below the seat unit 20.

Figure 3:
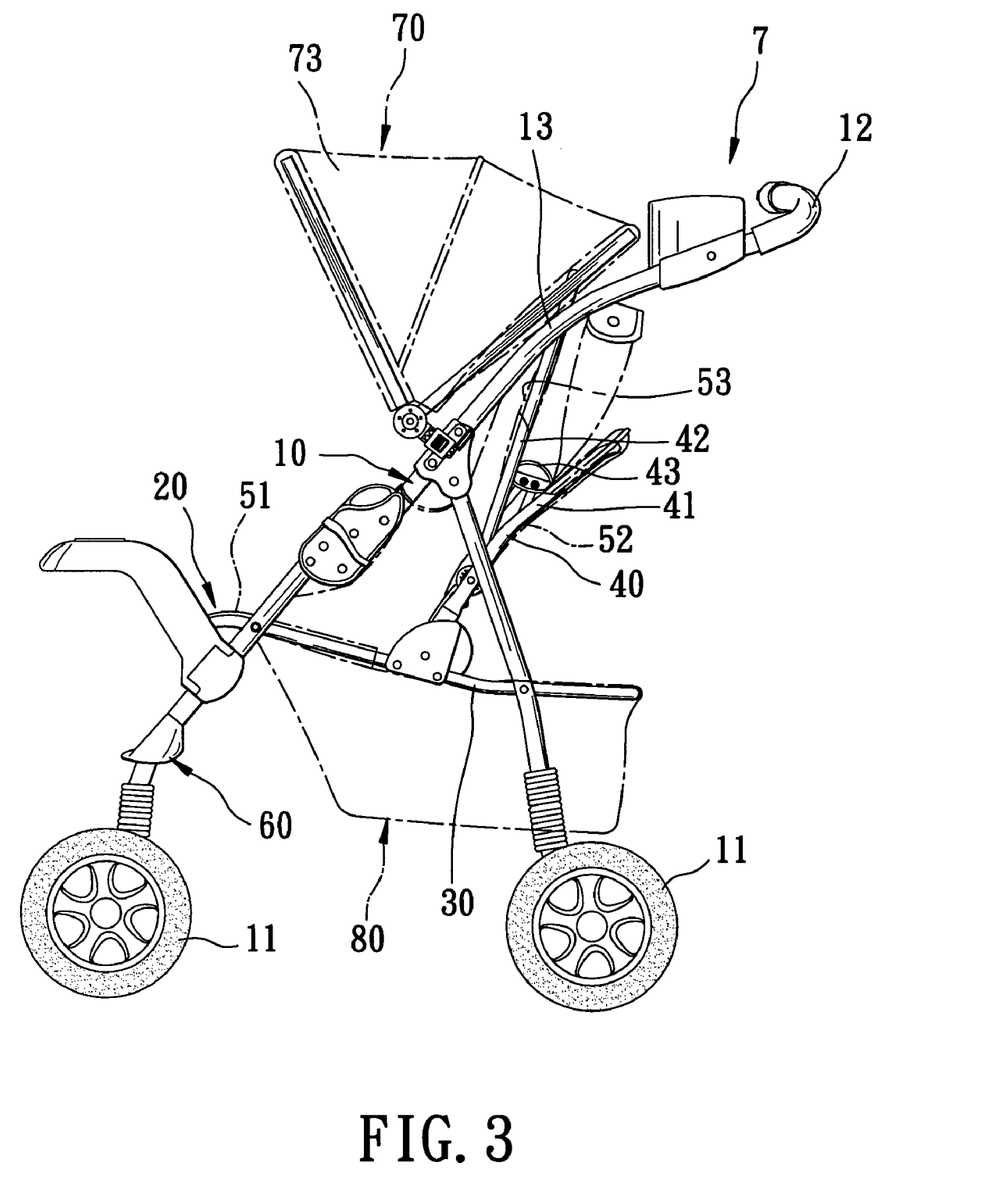
FIG. 3 is a schematic side view of the preferred embodiment.
Figure 9:
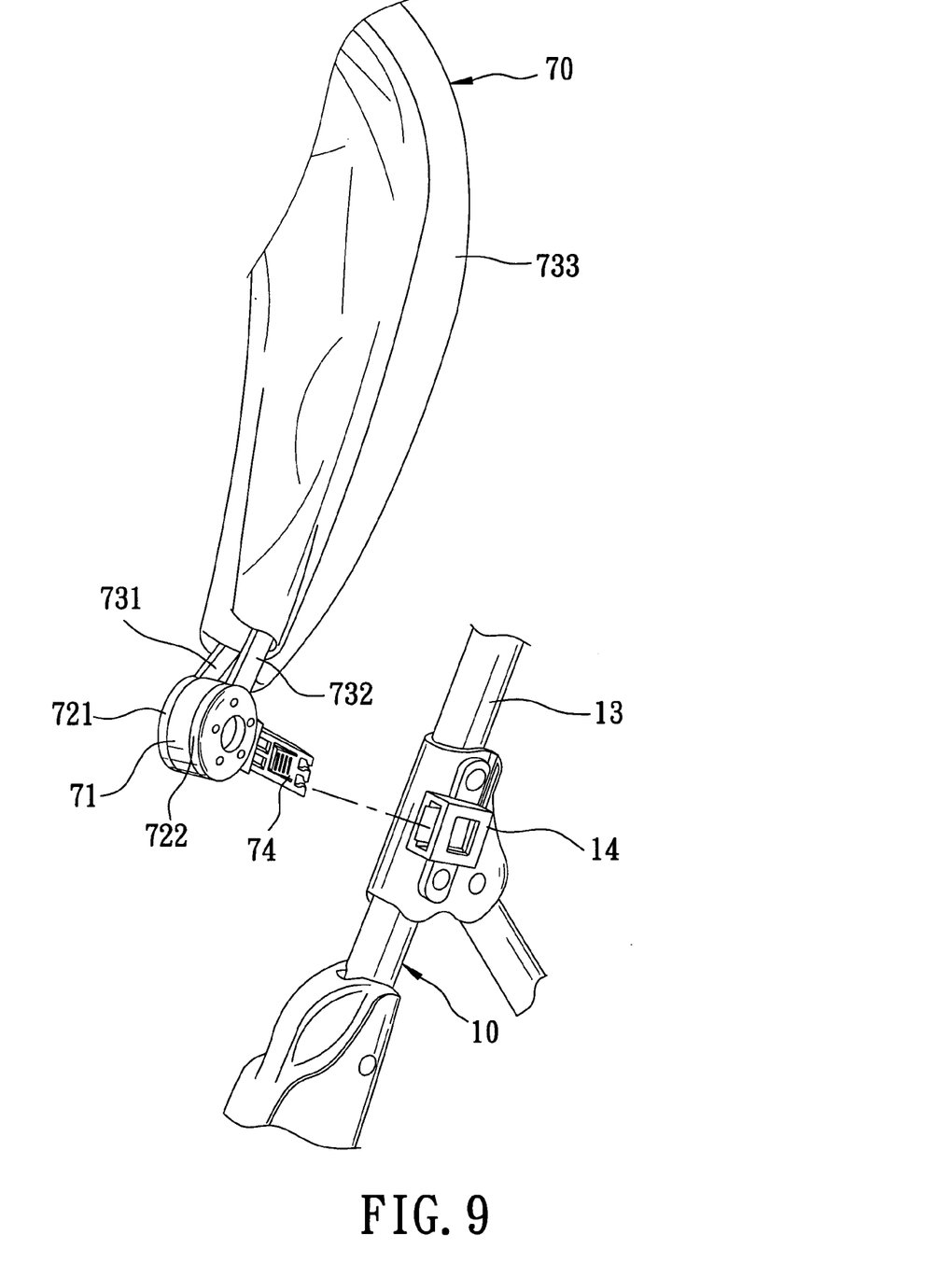
FIG. 9 is a fragmentary partly exploded perspective view to illustrate a foldable canopy unit of the preferred embodiment.
Figure 10:
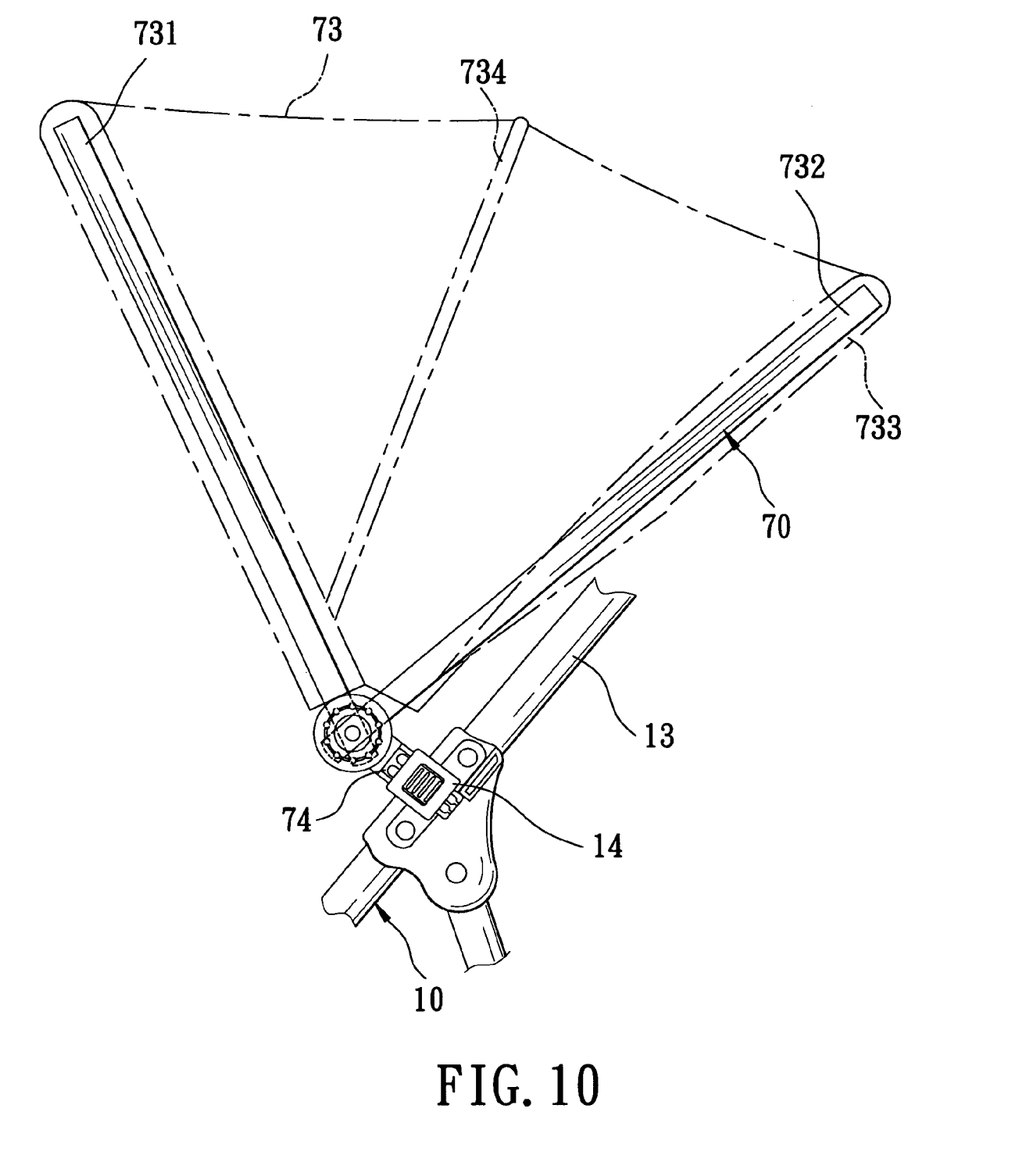
FIG. 10 is a schematic side view to illustrate the canopy unit in an unfolded state.
Figure 11:
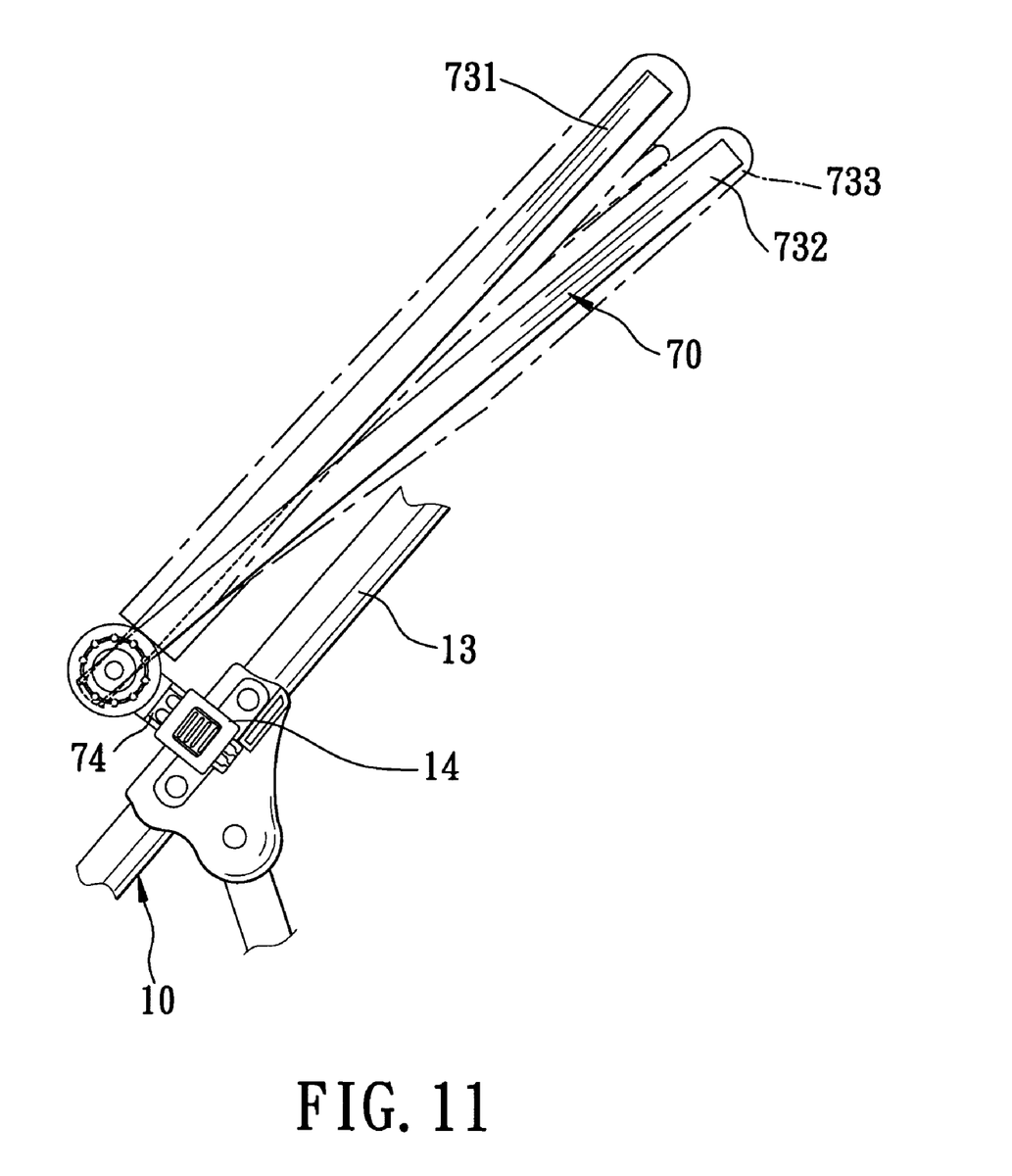
FIG. 11 is a schematic side view to illustrate the canopy unit in a folded state.

Referring to FIGS. 3, 9 and 10, the foldable canopy unit 70 is mounted removably on the upper frame section 13 of the stroller frame 10, and can be folded (as shown in FIG. 11) and unfolded (as shown in FIG. 10) relative to the stroller frame 10. The canopy unit 70 includes a coupling member 71, first and second canopy frame members 731, 732, and a canopy fabric 733. The coupling member 71 is mounted removably on the upper frame section 13 of the stroller frame 10, and has opposite end faces (not shown in the Figures). Two rotary discs 721, 722 are mounted rotatably and respectively on the end faces of the coupling member 71. Each of the first and second canopy frame members 731, 732 has one end coupled to a respective one of the rotary discs 721, 722 such that the first and second canopy frame members 731, 732 are thus rotatable relative to the coupling member 71. The canopy fabric 733 is connected to and extends between the first and second canopy frame members 731, 732 such that the canopy fabric 733 is stretched when the first and second canopy frame members 731, 732 are moved away from each other. A bracing rod 734 is sewn to the canopy fabric 733 to help retain the shape of the same when the canopy fabric 733 is stretched.

A fastening device fastens removably the coupling member 71 on the upper frame section 13 of the stroller frame 10. The fastening device includes complementary male and female fasteners 74, 14 provided respectively on the coupling member 71 and the upper frame section 13 of the stroller frame 10.

The storage basket 80 is disposed below the seat pad 51 for storage purposes.

Figure 4:
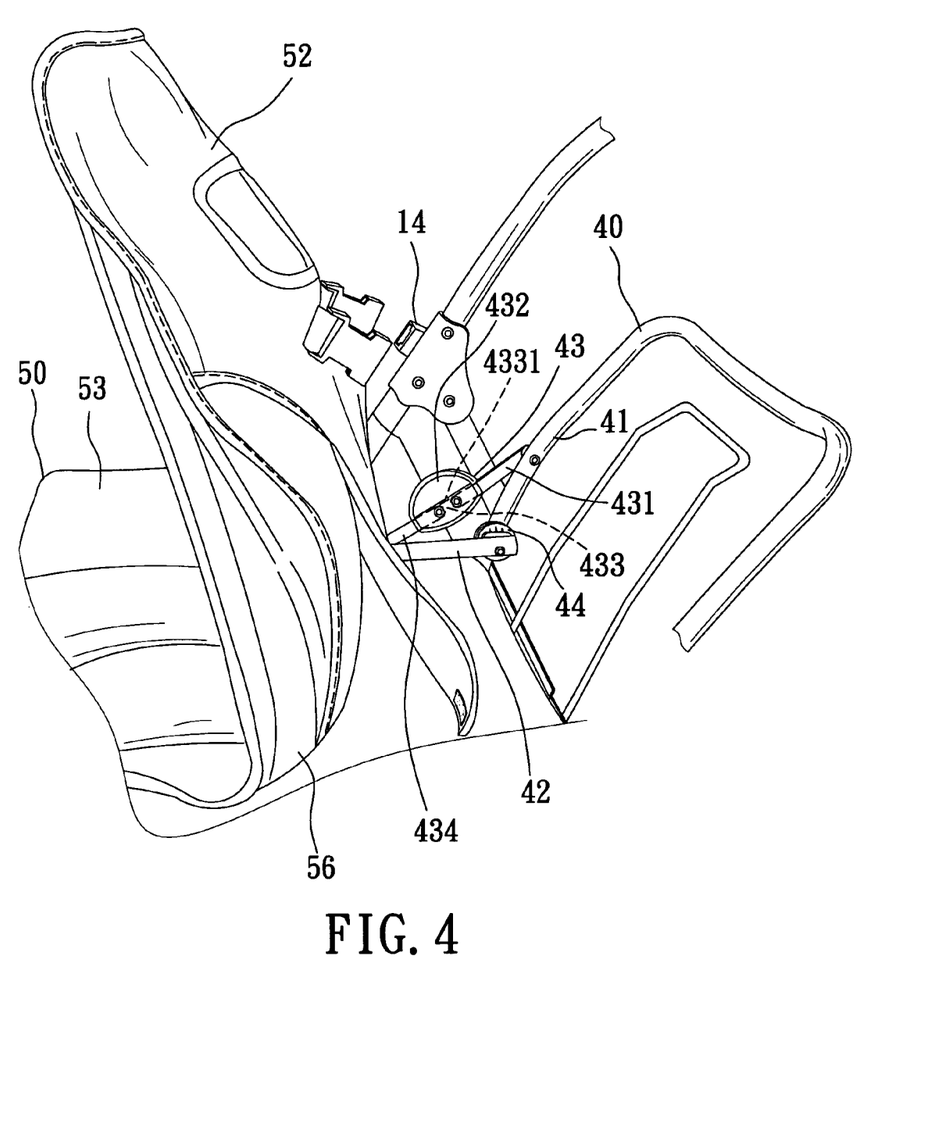
FIG. 4 is a fragmentary perspective view of the preferred embodiment to illustrate a movable frame member of a backrest frame unit at an unfolded position.
Figure 5:
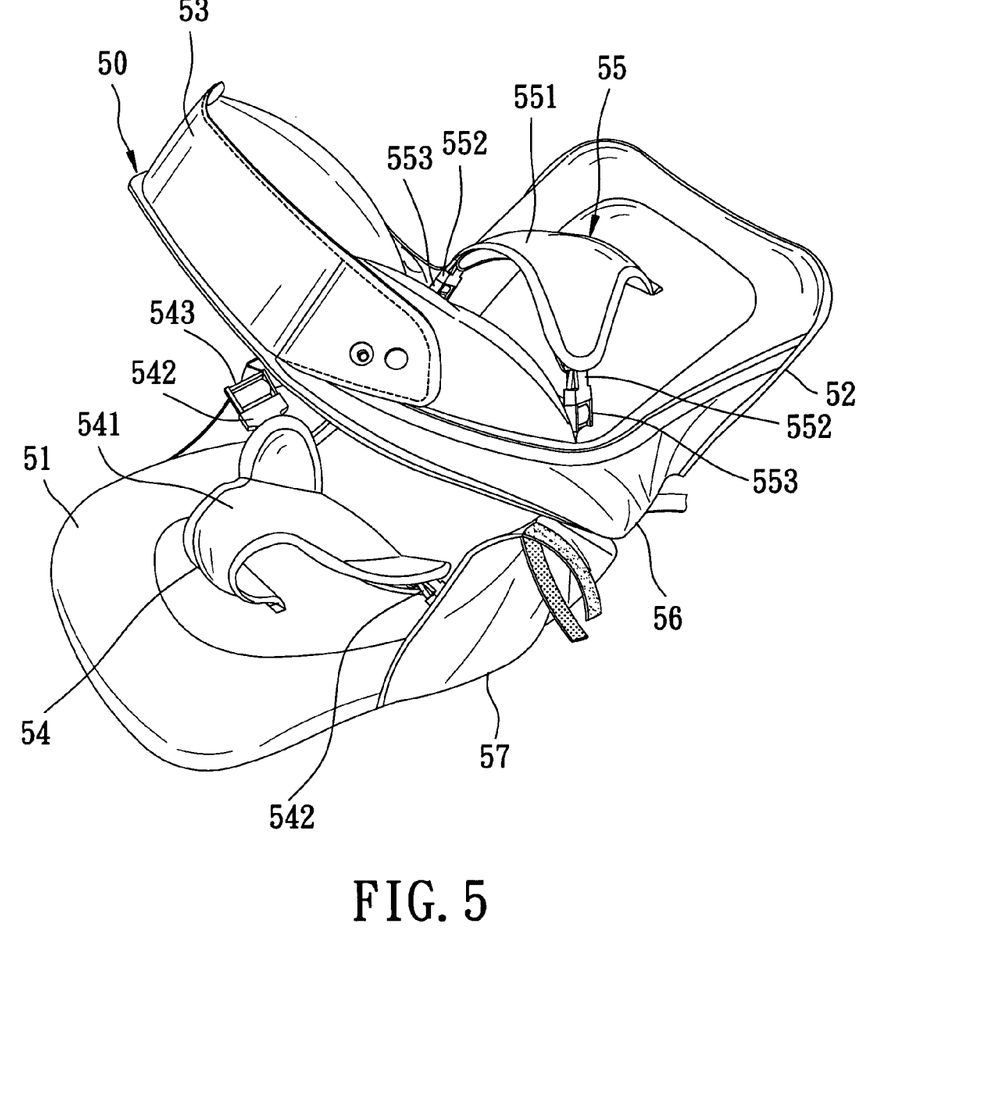
FIG. 5 is a fragmentary perspective view to illustrate a pad assembly of a seat unit of the preferred embodiment.

Referring to FIGS. 4, 5 and 12, when the stroller 7 is used for seating the baby 90 thereon, the movable frame member 42 is first folded toward the backrest support 41. At this moment, the seat pad 51 and the front side of the backrest pad 53 cooperate to define the seating space. After the baby 90 is seated on the seat pad 51 such that the back of the baby 90 rests on the backrest pad 53 and such that the restraint 541 is disposed between the legs of the baby 90, the fasteners 542, 543 of the safety belt device 54 are inter-engaged so as to retain the baby 90 in the seating space.

Referring to FIGS. 4, 5 and 13, when the stroller 7 is used for reclining the baby 100 thereon, the movable frame member 42 is first moved away from the backrest support 41 until the link member 43 is fully unfolded. When the baby 100 is laid in the reclining space formed by the backrest pad 53 and the back pad 52 such that the back of the baby 100 rests on the backrest pad 26 and such that the restraint 551 is disposed between the legs of the baby 100, the first and second fasteners 552, 553 of the safety belt device 55 are inter-engaged so as to retain the baby 100 in the reclining space.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A stroller comprising:
    a stroller frame including a wheeled lower frame section, an upper frame section provided with a handlebar, and a middle frame section between said lower and upper frame sections; and
    a seat unit including
        a horizontally extending seat frame mounted on said middle frame section of said stroller frame,
        a backrest frame unit including
            a backrest support mounted on and extending uprightly from said seat frame,
            a movable frame member connected pivotally to said backrest support and pivotable from a folded position, where said movable frame member is disposed proximate to said backrest support, to an unfolded position, where said movable frame member is moved away and extends inclinedly from said backrest support and where said movable frame member is disposed above said seat frame, and
            a foldable link member having opposite ends connected pivotally and respectively to said backrest support and said movable frame member, said link member being folded when said movable frame member is at the folded position, and being unfolded when said movable frame member is at the unfolded position for holding said movable member at the unfolded position, and
        a pad assembly including a seat pad mounted on said seat frame, a back pad mounted on said backrest support, and a backrest pad mounted on said movable frame member,
        said seat pad, said back pad, and said backrest pad having opposite lateral sides, said pad assembly further including a foldable connecting unit interconnecting said back pad and said backrest pad at said lateral sides of said back pad and said backrest pad, said foldable connecting unit cooperating with said link member to hold said movable frame member at the unfolded position when stretched,
        said seat pad and said backrest pad cooperating to form a seating space adapted for seating of a baby therein when said movable frame member is disposed at the folded position,
        said backrest pad and said back pad cooperating to form a reclining space adapted for reclining of the baby therein when said movable frame member is disposed at the unfolded position.

2. The stroller as claimed in claim 1, wherein said backrest frame unit further includes a friction unit for providing resistance to pivoting movement of said movable frame member relative to said backrest support.

3. The stroller as claimed in claim 2, wherein said movable frame member is rotatable relative to said backrest support about a pivot axis, said friction unit including a first disc mounted securely on said movable frame member and coaxial with the pivot axis, and a second disc mounted securely on said backrest support and coaxial with the pivot axis, said first and second discs having confronting teethed surfaces that are in friction engagement with each other.

4. The stroller as claimed in claim 1, further comprising a foldable canopy unit mounted removably on said upper frame section of said stroller frame.

5. The stroller as claimed in claim 4, wherein said canopy unit includes:
    a coupling member mounted removably on said upper frame section of said stroller frame;
    first and second canopy frame members coupled rotatably to said coupling member; and
    a canopy fabric connected to and extending between said first and second canopy frame members, said canopy fabric being stretched when said first and second canopy frame members are moved away from each other.

6. The stroller as claimed in claim 5, wherein said coupling member has opposite end faces, each of said first and second canopy frame members being coupled rotatably to a respective one of said end faces of said coupling member.

7. The stroller as claimed in claim 6, wherein said canopy unit further includes a fastening device for fastening removably said coupling member on said upper frame section of said stroller frame.

8. The stroller as claimed in claim 7, wherein said fastening device includes complementary male and female fasteners provided respectively on said coupling member and said upper frame section of said stroller frame.

9. The stroller as claimed in claim 1, wherein said link member includes:
    a first link having a first link portion connected pivotally to said backrest support, and an opposite second link portion;
    a second link having a first link portion connected pivotally to said movable frame member, and an opposite second link portion; and
    a connecting plate connected pivotally to said second link portions of said first and second links, said connecting plate being formed with a stop flange that abuts against said second link portions when said link member is unfolded.

10. The stroller as claimed in claim 1, wherein said foldable connecting unit includes a pair of fabric flaps connected to said lateral sides of said back pad and said backrest pad.

11. The stroller as claimed in claim 1, wherein said pad assembly further includes a pair of fabric flaps interconnecting said lateral sides of said backrest pad and said seat pad.

12. The stroller as claimed in claim 1, wherein said pad assembly further includes a safety belt device adapted for retaining the baby in said reclining space.

13. The stroller as claimed in claim 12, wherein said back pad has a front side, and said safety belt device includes:
    a generally T-shaped restraint having a first section connected to said front side of said back pad, and a second section transverse to said first section and having opposite ends, each of which is provided with a first fastener; and a pair of second fasteners connected to said backrest pad and engaging releasably and respectively said first fasteners on said ends of said second section of said restraint so as to be adapted to retain the baby in said reclining space.

14. The stroller as claimed in claim 1, wherein said pad assembly further includes a safety belt device adapted for retaining the baby in said seating space.

15. The stroller as claimed in claim 14, wherein said seat pad has a top side, and said safety belt device includes:

a generally T-shaped restraint having a first section connected to said top side of said seat pad, and a second section transverse to said first section and having opposite ends, each of which is provided with a first fastener; and a pair of second fasteners connected to said backrest pad for engaging releasably and respectively said first fasteners on said ends of said second section of said restraint so as to be adapted to retain the baby in said seating space.

* * * * *